United States Patent Office 2,906,719
Patented Sept. 29, 1959

2,906,719

STABILIZING CHLOROETHYLENE POLYMERS WITH CADMIUM HYDROXY LAURATE AND LEAD STEARATE

Erwin M. Jankowiak, Midland, and Alfred R. Nelson, Bay City, Mich., assignors to The Dow Chemical Company, Midland, Mich., a corporation of Delaware No Drawing. Application February 10, 1956
Serial No. 564,636

6 Claims. (Cl. 260—23)

This invention relates to a new and improved process for stablizing haloethylene polymers against thermal degradations. The invention likewise includes the stabilized compositions produced in accordance with that process.

Haloethylene polymers, such as polyvinyl chloride, are commonly fabricated into useful articles by thermal fabrication methods. Additionally the articles fabricated from haloethylene polymers are frequently exposed to relatively high temperatures for prolonged periods of time. It is common knowledge that such haloethylene polymers and the articles produced therefrom are seriously degraded by a loss of HCl from the polymer chain when exposed in the unstabilized condition to the effects of heat. That degradation which exhibits itself as a discoloration and a reduction in properties is rapid and in a very short time can render the polymer or the article commercially useless. The prior practice has been to blend certain additives with the polymer to stablize the polymer to elevated temperatures. Blending operations are time-consuming since the additive must be uniformly distributed throughout the polymer mass and are costly because of the capital investment required for equipment, the manpower required and the horsepower used. It would be desirable if the additives could be incorporated into the monomer charge prior to polymerization. Most stabilizers however inhibit or seriously retard polymerization, destroying any economic advantage.

It is the principal object of this invention to provide an improved process for stabilizing haloethylene polymers to the degradative effects of elevated temperatures.

It is a further object to provide such a process for stabilizing haloethylene polymers which will eliminate the costly and time-consuming blending operations.

It is a still further object to provide a stabilized composition based on haloethylene polymers which has improved resistance to the degradative effects of elevated temperatures.

The above and related objects are accomplished by means of a process consisting of the preparation of a polymerizable charge comprising haloethylene monomers, polymerization catalyst, and certain heat stabilizers dispersed in non-emulsified aqueous suspension, subjecting that charge to polymerization conditions with agitation and thereafter recovering the polymer. The invention likewise includes compositions based on haloethylene polymers containing the heat stabilizers.

The haloethylene polymers which may be employed in the process and compositions of this invention are any polymers and copolymers containing halogen substituents and prepared from vinyl monomers. Typical examples of such polymers are the polymers of vinyl chloride and vinylidene chloride, the copolymers of vinyl chloride and vinylidene chloride, and the copolymers of either vinyl chloride or vinylidene chloride wih another copolymerizable monomer, such as vinyl acetate or acrylonitrile. The polymers and copolymers of vinyl chloride and vinylidene chloride present the greatest problem in heat stability and are preferred.

The preparation of polymers in non-emulsified aqueous suspension is old in the polymerization art. Typically a monomer or a mixture of two or more comonomers is dispersed in an aqueous medium containing a water soluble dispersing agent, such as certain cellulose ethers. Polymerization is initiated and maintained by means of a polymerization catalyst, such as benzoyl peroxide or lauroyl peroxide, at a temperature of from 30° C. to 70° C. The polymerization system is commonly agitated throughout polymerization to help maintain the dispersion and to help the heat transfer characteristics of the system. Following completion of the polymerization the polymer is recovered by filtration or centrifuging and then dried. The heat stabilizer to be used in the invention consists of a combination of lead stearate, together with cadmium alpha-hydroxylaurate. That compound is sold commercially as P-1576 by Advance Solvents and Chemicals Co. and may contain trace amounts of cadmium alphahydroxy myristic acid. The lead stearate may be either n-lead stearate or dibasic lead stearate, although n-lead stearate is the most efficient and accordingly is preferred. The combination of the two ingredients exhibits a synergistic effect in thermally stabilizing haloethylene polymers that far surpasses any prediction of their stabilizing effectiveness.

Each of the ingredients of the heat stabilizer may be used in amounts of from 0.5 to 4 percent by weight based on the weight of the polymer, with the percentage of the combined ingredients not to exceed 5 percent of the weight of the polymer. The ingredients may be used in any combination of percentages providing the above limitations are observed. It should be apparent that some polymers, such as those composed predominantly of vinylidene chloride, are less resistant inherently to the degradative effects of heat and consequently will require correspondingly more stabilizer to arrive at a given degree of resistance. An investigator will be able to determine the optimum amount of stabilizer required for any polymer by simple preliminary experimentation. When less than 0.5 percent of each ingredient is employed the effectiveness of the stabilizer is so low that the thermal resistance imparted to the composition is negligible. When greater amounts than 5 percent of the stabilizer are used there are no additional benefits which accrue to the composition and some of the properties, such as strength and clarity may suffer.

The manner in which the stabilizer is added to the polymerization charge is unimportant. It has been found to be most convenient to add both ingredients to the aqueous phase prior to the introduction of the monomer especially when volatile monomers such as vinylidene chloride and vinyl chloride are being used.

The heat stabilizer of this invention may be employed in compositions based on haloethylene polymers which likewise contain the other common additives which are blended with such polymers to produce commercial formulations. Thus, the stabilizer may be used in plasticized, filled, and pigmented compositions which likewise contain stabilizers for the polymer against the effects of light. The process and composition of this invention have an additional advantage when such compositions are prepared, since the heat stabilizer is intimately distributed throughout the polymer prior to blending into the composition of the plasticizers, pigments, fillers, and the like. Such blending is frequently carried out on hot mills which would have a serious effect on the thermal life of the polymer if an unstabilized polymer was employed. Additionally n-lead stearate acts as a lubricant to prevent sticking of the composition to the hot rolls of the mill. Still further, the polymers resulting from this process have a greater porosity than unstabilized polymers, resulting in a more rapid and uniform distribution of the other additives into the polymer.

By way of example several polymerization charges were prepared consisting basically of 100 parts of water, 50 parts of vinyl chloride, 0.1 part lauroyl peroxide, and 0.1 part of methyl hydroxy propyl cellulose. One of the charges was left as a blank. To some of the charges were added varying amounts of the ingredients comprising the stabilizer of this invention. To others were added amounts of only one of the ingredients. The charges were prepared by mixing the stabilizer into the monomer and catalyst and adding that to an aqueous phase containing the cellulose ether. Polymerization was initiated and maintained by heating the charge to 50° C. with agitation for 16 hours. The polymer was filtered, washed several times with water, and dried. Plasticized compositions were prepared by milling at 171° C. for 5 minutes 100 parts by weight of each of the polymers with 50 parts of dioctyl phthalate. The compositions were compression molded into test specimens and the specimens exposed in a convection oven at 171° C. for 3 hours or more. Periodically the specimens were visually examined for discoloration. The results are shown in the following table.

*Table*

| Percent by weight of polymer | | Original color | Color after exposure | | |
|---|---|---|---|---|---|
| n-Lead stearate | Cadmium alpha-hydroxy-laurate | | 1 hour | 2 hours | 4 hours |
| 0 | 0 | Light tan | Brown | Dark brown | |
| 1 | 0 | Colorless | do | do | |
| 2 | 0 | do | do | do | |
| 0 | 4 | do | Tan | Brown | Dark brown. |
| 1 | 1 | do | Colorless | Colorless | Light tan. |
| 1 | 2 | do | do | do | Do. |
| 2 | 2 | do | do | do | Do. |

The results indicate very clearly the outstanding stability imparted to the compositions when both of the ingredients of the stabilizer are present as compared to that imparted when only one of the ingredients is present.

Similar results were obtained when compositions were prepared from copolymers of vinylidene chloride and vinyl chloride.

We claim:

1. A process for stabilizing chloroethylene polymers against the degradative effects of heat comprising the addition to the chloroethylenic monomer prior to polymerization of at least 0.5 percent by weight of lead stearate and at least 0.5 percent by weight of cadmium alpha-hydroxylaurate, the aggregate weight of both ingredients not to exceed 5 percent by weight of said monomer, dispersing said monomer and said ingredients together with a polymerization catalyst into an aqueous phase, subjecting the so-formed dispersion to polymerization conditions, recovering the polymer formed, and finally drying said polymer.

2. The process claimed in claim 1 wherein the chloroethylene monomer is vinyl chloride.

3. The process claimed in claim 1 wherein the chloroethylene monomer consists of a mixture of vinyl chloride and vinylidene chloride.

4. A thermally stable composition of matter comprising from 95–99 percent by weight of a chloroethylene polymer and from 5–1 percent by weight of an agent consisting of lead stearate and cadmium alpha-hydroxy laurate.

5. The composition claimed in claim 4 wherein the chloroethylene polymer is polyvinyl chloride.

6. The composition claimed in claim 4 wherein the chloroethylene polymer is a copolymer of vinyl chloride and vinylidene chloride.

References Cited in the file of this patent

UNITED STATES PATENTS 2,075,543   Reed et al.   Mar. 30, 1937

FOREIGN PATENTS 599,429   Great Britain   May 11, 1944